US012598639B2

(12) United States Patent
Zhang

(10) Patent No.: US 12,598,639 B2
(45) Date of Patent: Apr. 7, 2026

(54) METHOD AND APPARATUS FOR DOWNLINK LBT, DEVICE AND STORAGE MEDIUM

(71) Applicant: Spreadtrum Communications (Shanghai) Co., Ltd., Shanghai (CN)

(72) Inventor: Meng Zhang, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 420 days.

(21) Appl. No.: 18/032,708

(22) PCT Filed: Oct. 19, 2021

(86) PCT No.: PCT/CN2021/124776
§ 371 (c)(1),
(2) Date: Apr. 19, 2023

(87) PCT Pub. No.: WO2022/083595
PCT Pub. Date: Apr. 28, 2022

(65) Prior Publication Data
US 2023/0413321 A1    Dec. 21, 2023

(30) Foreign Application Priority Data

Oct. 19, 2020    (CN) .......................... 202011120000.7

(51) Int. Cl.
*H04W 74/0808* (2024.01)
(52) U.S. Cl.
CPC .............................. *H04W 74/0808* (2013.01)

(58) Field of Classification Search
CPC ................................................ H04W 74/0808
See application file for complete search history.

(56) References Cited

U.S. PATENT DOCUMENTS

| | | | | |
|---|---|---|---|---|
| 12,048,002 | B2 * | 7/2024 | Thangarasa | ........... H04W 74/08 |
| 12,231,916 | B2 * | 2/2025 | He | ......................... H04W 16/28 |
| 2018/0017695 | A1 | 1/2018 | Wang et al. | |
| 2018/0176954 | A1 * | 6/2018 | Singh | ................ H04W 74/0816 |
| 2018/0227953 | A1 * | 8/2018 | Kusashima | ............... H04J 1/00 |
| 2020/0005379 | A1 | 1/2020 | Bastide et al. | |
| 2020/0106565 | A1 * | 4/2020 | Li | ..................... H04W 74/0808 |
| 2020/0154480 | A1 * | 5/2020 | Jose | ................. H04W 74/0825 |

(Continued)

FOREIGN PATENT DOCUMENTS

| | | |
|---|---|---|
| CN | 105634631 A | 6/2016 |
| CN | 110268795 A | 9/2019 |

(Continued)

OTHER PUBLICATIONS

Chinese Office Action dated May 20, 2023. Chinese Application No. Application No. 202011120000.7.

(Continued)

*Primary Examiner* — Nizar N Sivji
(74) *Attorney, Agent, or Firm* — Quarles & Brady LLP

(57) ABSTRACT

A method for downlink LBT is provided in the present disclosure. The method includes: detecting channel energy and uplink transmission energy within a monitoring period; determining a channel state within the monitoring period according to the channel energy and the uplink transmission energy; and performing downlink data transmission when the channel state is an idle state.

14 Claims, 3 Drawing Sheets

(56)          References Cited

U.S. PATENT DOCUMENTS

| | | | | |
|---|---|---|---|---|
| 2020/0305191 A1* | 9/2020 | Moon | .................... | H04W 72/23 |
| 2020/0351942 A1* | 11/2020 | Jia | ..................... | H04W 74/0808 |
| 2020/0383095 A1* | 12/2020 | Moon | ..................... | H04L 5/001 |
| 2021/0153250 A1* | 5/2021 | Jiang | ......................... | H04L 1/00 |
| 2023/0354275 A1* | 11/2023 | Moon | .............. | H04W 74/0808 |

FOREIGN PATENT DOCUMENTS

| | | | | |
|---|---|---|---|---|
| EP | 3217756 A1 * | 9/2017 | ........ | H04W 72/1278 |
| EP | 3576481 A1 | 4/2019 | | |
| WO | 2019160741 A1 | 8/2019 | | |
| WO | 2019205024 A1 | 10/2019 | | |

OTHER PUBLICATIONS

International Search Report and Written Opinion, PCT Application No. PCT/CN2021/124776, Filed Oct. 19, 2021.
Extended European Search Report, European Patent Application No. 21882011.6, Feb. 6, 2024.

* cited by examiner

Detect channel energy and uplink transmission energy within a monitoring period ———— S201

Determine a channel state within the monitoring period according to the channel energy and the uplink transmission energy ———— S202

Perform downlink data transmission when the channel state is an idle state ———— S203

METHOD AND APPARATUS FOR DOWNLINK LBT, DEVICE AND STORAGE MEDIUM

CROSS-REFERENCE TO RELATED APPLICATION

This application is a National Stage of International Application PCT/CN2021/124776, filed on Oct. 19, 2021, which claims priority to Chinese Patent Application No. 202011120000.7, filed with China National Intellectual Property Administration on Oct. 19, 2020, both of which are incorporated by reference herein.

TECHNICAL FIELD

The present disclosure relates to the field of communication technologies and, in particular, to a method and an apparatus for downlink listen before talk (Listen Before Talk, abbreviated as LBT), a device and a storage medium.

BACKGROUND

In future communication systems, with the demand for higher data rates, the demand for spectrum resources is also explosively growing. By means of full-duplex communication technologies, uplink transmission and downlink transmission can be simultaneously performed on the same time-frequency resource, thereby greatly improving utilization of the spectrum resources.

SUMMARY

In a first aspect, the present disclosure provides a method for downlink LBT, including:

detecting channel energy and uplink transmission energy within a monitoring period;

determining a channel state within the monitoring period according to the channel energy and the uplink transmission energy;

performing downlink data transmission when the channel state is an idle state.

In a second aspect, the present disclosure provides an apparatus for downlink LBT, including a memory and a processor, where the memory is configured to store a computer program;

when the computer program is executed, the processor is configured to detect channel energy and uplink transmission energy within a monitoring period;

determine a channel state within the monitoring period according to the channel energy and the uplink transmission energy;

perform downlink data transmission when the channel state is an idle state.

In a third aspect, the present disclosure provides a non-transitory computer-readable storage medium on which a computer program is stored. When the computer program is executed by a processor, the following steps are implemented: detecting channel energy and uplink transmission energy within a monitoring period; determining a channel state within the monitoring period according to the channel energy and the uplink transmission energy; and performing downlink data transmission when the channel state is an idle state.

BRIEF DESCRIPTION OF DRAWINGS

To describe technical solutions in embodiments of the present disclosure or in the prior art more clearly, the accompanying drawings required for describing the embodiments or the prior art will be briefly introduced hereunder. Apparently, the accompanying drawings in the following description show some embodiments of the present disclosure. For a person of ordinary skill in the art, other drawings may also be obtained according to these drawings without creative efforts.

FIG. 1 is an application scenario diagram of full-duplex communication.

DESCRIPTION OF EMBODIMENTS

Figure 2:
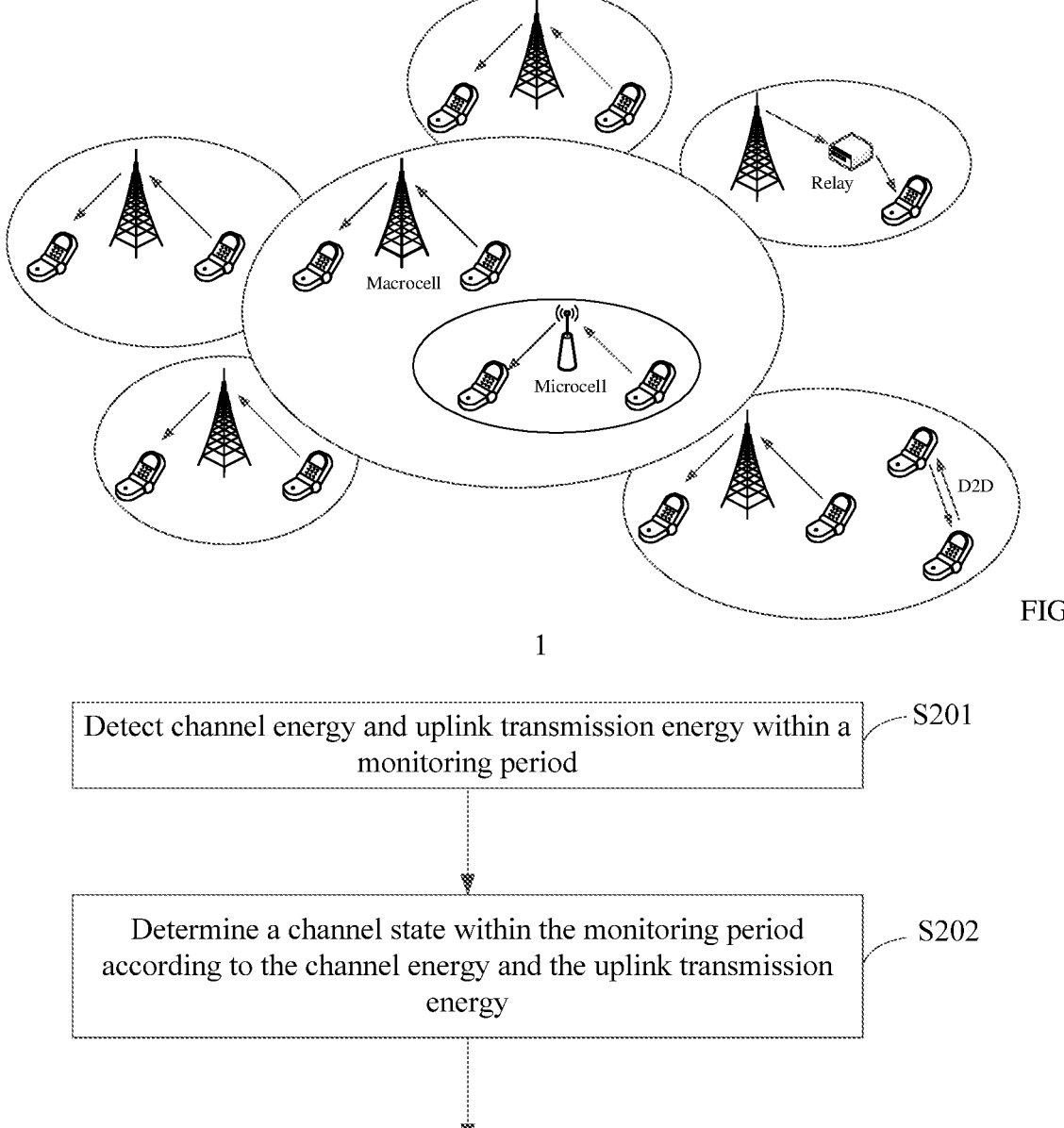
FIG. 2 is a schematic flowchart of a method for downlink LBT according to an embodiment of the present disclosure.

To make objectives, technical solutions, and advantages of embodiments of the present disclosure clearer, the technical solutions in the embodiments of the present disclosure will be described hereunder clearly and comprehensively with reference to the accompanying drawings in the embodiments of the present disclosure. Apparently, the described embodiments are intended for merely a part rather than all of the embodiments of the present disclosure. All other embodiments obtained by a person of ordinary skill in the art based on the embodiments of the present disclosure without creative efforts shall fall within the protection scope of the present disclosure.

The method for downlink LBT provided in the present disclosure is applied to a scenario of full-duplex communication. Illustratively, as shown in FIG. 1, an application scenario of full-duplex communication may be a hotspot with discontinuous coverage, such as a femtocell or WIFI; or a scenario with continuous coverage, such as a homogeneous network scenario or a heterogeneous network scenario, or a device-to-device (Device-to-Device, abbreviated as D2D) short-distance communication scenario, which is not limited in the present disclosure.

The terminal in the embodiments of the present disclosure may also be referred to as a terminal equipment, a subscriber unit, a subscriber station, a mobile station, a remote station, an access point, a remote terminal, an access terminal, a user terminal, a user agent, or a user equipment, which is not limited herein. The UE in the embodiments of the present disclosure may adopt half-duplex or full-duplex.

The network device in the embodiments of the present disclosure refers to a communication network device providing a communication service for a terminal, including a base station (abbreviated as BS) in a radio access network, further including a base station controller in the radio access network, and further including a device at the core network side.

The base station may also be referred to as a base station device, and is an apparatus deployed in a radio access network (RAN) to provide a wireless communication function. For example, a device providing a base station function in a 4G network includes an evolved node B (evolved NodeB, abbreviated as eNB), a device gNB providing a base station function in 5G new radio (abbreviated as NR), and a next generation evolved node B (ng-eNB). The gNB and the terminal communicate with each other by using NR technologies, the ng-eNB and the terminal communicate with each other by using evolved universal terrestrial radio access (abbreviated as E-UTRA) technologies, both the gNB and the ng-eNB may be connected to the 5G core network. The base station in the embodiments of the present disclosure further includes a device providing a base station function in a future new communication system, and the like. The base station in the embodiments of the present disclosure may be a full-duplex base station, and may serve uplink and downlink of different UEs on the same time-frequency resource, for example, uplink of UE-1 and downlink of UE-2; or serve uplink and downlink of the same UE.

In the related art, in the full-duplex communication scenario, there may be various methods for performing LBT when a channel is accessed on an unlicensed spectrum, including CAT4 LBT, One Shot LBT, and LBT suitable for FR2. In the various LBT methods, a base station or a terminal determines whether a channel state is idle or busy by detecting channel energy. A problem that may occur in this case is that, in a full-duplex system, when downlink LBT is performed, an uplink signal for paired transmission may exist on the same time-frequency resource, and therefore the channel energy obtained when performing channel energy detection includes this part of uplink transmission energy. However, in practice, only downlink transmission energy needs to be considered when performing downlink LBT. Therefore, in the current method, the channel energy detected in a downlink LBT process is not accurate, which results in that the channel state determined based on the channel energy is not accurate, thereby affecting downlink transmission. For example, due to existence of uplink transmission, channel energy detected in the downlink LBT process is excessively high, so that it is determined that a channel state is busy and downlink transmission cannot be performed, thereby reducing spectrum utilization.

To this end, the present disclosure provides a method for downlink LBT, which improves a method for determining a channel state. Within a monitoring period, in addition to detecting channel energy, uplink transmission energy is further determined, and this part of uplink transmission energy is removed from total channel energy, so that a channel state can be evaluated based on a more accurate energy value, and the spectrum utilization is improved. The method for downlink LBT provided in the present disclosure is described below with reference to embodiments. A channel presented in the present disclosure may be understood as a time-frequency resource area, and a terminal or a base station may perform LBT monitoring in the time-frequency resource area.

FIG. 2 is a schematic flowchart of a method for downlink LBT according to an embodiment of the present disclosure. An execution subject of the method may be a network device or a terminal, and an example that the network device is a base station is used for description. As shown in FIG. 2, the method includes the following.

S201, detect channel energy and uplink transmission energy within a monitoring period.

S202, determine a channel state within the monitoring period according to the channel energy and the uplink transmission energy.

S203, perform downlink data transmission when the channel state is an idle state.

When the base station performs downlink LBT, channel energy may be detected by using one or more detection time windows within the monitoring period, so as to determine a channel state. In this embodiment, besides detecting the channel energy within the monitoring period, the base station may also determine the uplink transmission energy according to the detected channel energy.

The base station removes the uplink transmission energy from the detected channel energy, i.e., determines a channel state within the monitoring period according to a difference between the channel energy and the uplink transmission energy, so that the channel state determined based on the channel energy is more accurate, thereby guaranteeing the downlink transmission, and improving the spectrum utilization.

Illustratively, the base station calculates energy of corresponding uplink signals on a time-frequency resource for performing LBT, removes the energy of the uplink signals from an energy detection result of a corresponding LBT, and uses the calculated energy detection result to determine whether the time-frequency resource monitored in the LBT process is idle or busy.

Specifically, the monitoring period includes at least one detection time window and a calculation time window. The base station detects respective channel energy within each detection time window, and calculates the uplink transmission energy within the calculation time window, so as to determine a channel state within each detection time window according to a respective difference between the channel energy within each detection time window and the uplink transmission energy; and determine the channel state within the monitoring period according to the channel state within each detection time window.

The quantity of detection time windows included in the monitoring period may vary with different LBT methods. If the monitoring period includes a plurality of detection time windows, the calculation time window may be between any two detection time windows of the plurality of detection time windows. Or, when the monitoring period includes one or more detection time windows, the calculation time window may be after the one or more detection time windows.

On the basis of the method for downlink LBT provided in the present disclosure, CAT4 LBT, One Shot LBT and LBT suitable for FR2 in the related art are respectively improved, which will be described in detail below.

Type 1: CAT4 LBT

1) Set $N=N_{init}$, where $N_{init}$ is a random number distributed between 0 and $CW_p$ with a uniform probability, and then execute step 4).

2) If $N>0$ and the base station selects a decrement counter, then set $N=N-1$.

3) Detect a channel within an additional detection slot $T_{sl}$, and if the channel within the additional detection slot $T_{sl}$ is idle, execute step 4); otherwise, execute step 5).

4) If $N=0$, then stop; otherwise, execute step 2).

5) Detect the channel until a busy detection slot $T_{sl}$ is detected within one additional delay duration $T_d$ or all detection slots $T_{sl}$ within the additional delay duration $T_d$ are detected as idle.

6) If the channel is detected as idle in all detection slots $T_{sl}$ within the additional delay duration $T_d$, turn to step 4); otherwise, execute step 5).

In the described steps, the delay duration $T_d$ includes a duration $T_f$=16 us and $m_p$ successive detection slots $T_{sl}$ thereafter, and $T_f$ includes a detection slot $T_{sl}$ at the beginning of $T_f$.

$CW_{min,p} \leq CW_p \leq CW_{max,p}$ is a contention window, values of $CW_{min,p}$ and $CW_{max,p}$ are determined before step 1).

$m_p$, $CW_{min,p}$ and $CW_{max,p}$ are determined based on a channel access priority p associated with base station transmission.

It can be seen that the process of CAT4 LBT includes a plurality of detection time windows, and each detection time window is $T_f$=16 us or a detection slot $T_{sl}$. The described steps 1) to 6) are performed cyclically according to a channel state in each detection time window, and until N=0, it is determined that downlink transmission may be performed.

In order to ensure accuracy of the channel state within each detection time window, according to the method in the embodiments of the present disclosure, a calculation time window D is added between a plurality of detection time windows, or a calculation time window D is added after a plurality of detection time windows. Uplink transmission energy is calculated within the calculation time window D, and the uplink transmission energy is subtracted from channel energy within each detection time window, to determine a channel state within each detection time window.

Figure 3:
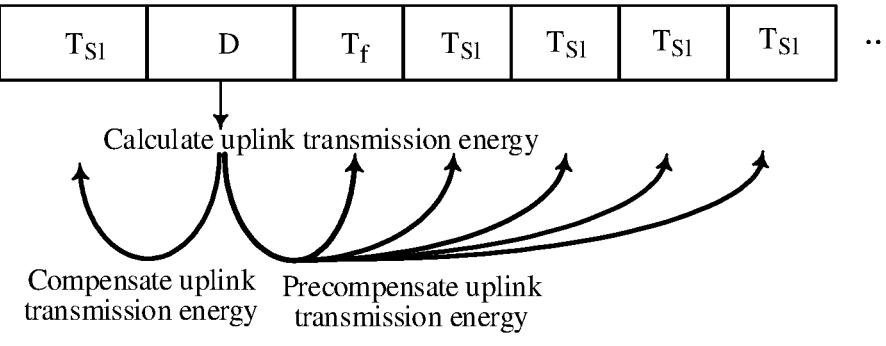
FIG. 3 is a schematic diagram of a monitoring period according to an embodiment of the present disclosure.

As shown in FIG. 3, the calculation time window D being after a first $T_{sl}$ is taken as an example, after performing channel energy detection of an additional detection slot $T_{sl}$ for the first time in step 3), the base station, next, calculates the uplink transmission energy within the calculation time window D, and then subtracts the uplink transmission energy from the channel energy within the first $T_{sl}$ to determine that a channel state of the first $T_{sl}$ is idle or busy, and continues the foregoing loop in step 3) according to the channel state of the first $T_{sl}$. In each subsequent detection slot of $T_{sl}$ or $T_f$, the uplink transmission energy is subtracted from the detected channel energy, so as to determine the channel state within each $T_{sl}$ or $T_f$. Thus, an execution step of the loop is determined, and until N=0, it is determined that the channel state within the monitoring period is idle, and the downlink transmission can be performed.

It should be noted that, in FIG. 3, that the calculation time window D is after the first $T_{sl}$ is taken as an example for description, and in actual applications, the calculation time window D may be set after any $T_{sl}$ or $T_f$. A specific position of the time window D may be determined in a predefined manner, or may be indicated by the base station through higher-layer signaling or downlink control information (DCI).

Type 2: One Shot LBT

Type 2A Downlink Channel Access Procedure

The base station sends downlink transmission after detecting that a channel is idle for at least a detection interval $T_{short\_dl}$=25 us, where $T_{short\_dl}$ includes a duration $T_f$=16 us and a detection slot of 9 us thereafter, and $T_f$ includes a detection slot of 9 us at the beginning of $T_f$.

Figure 4:
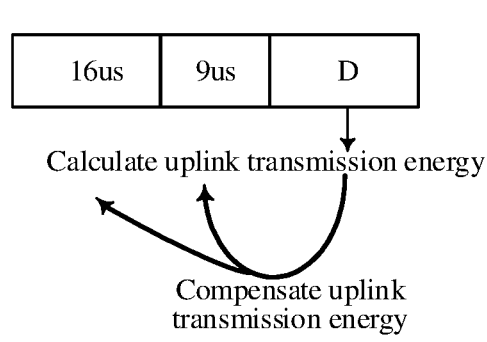
FIG. 4 is a schematic diagram of a monitoring period according to an embodiment of the present disclosure.

It can be seen that in this manner, the base station performs channel detection once within a duration of $T_f$=16 us, and performs channel detection once again within a subsequent detection slot of 9 us, that is, a detection time window of $T_f$=16 us and a detection time window with a detection slot of 9 us are included in the monitoring period. In order to ensure accuracy of the channel state detected each time, according to the method of the embodiments of the present disclosure, a calculation time window D is added between $T_f$ and the subsequent detection slot of 9 us. Uplink transmission energy is calculated within the calculation time window D. As shown in FIG. 4, after performing channel energy detection once within the time of a duration $T_f$=16 us, the base station next calculates the uplink transmission energy within the calculation time window D, then determines a channel state within $T_f$=16 us by subtracting the uplink transmission energy from the channel energy within $T_f$=16 us, and continues to perform channel energy detection once again within the subsequent detection slot of 9 us, and determines a channel state within the detection slot of 9 us by subtracting the uplink transmission energy from the channel energy within the detection slot of 9 us. If the two channel states detected within $T_f$=16 us and within the detection slot of 9 us are both idle, it may be determined that the channel state within the monitoring period is idle, and downlink transmission can be performed.

Figure 5:
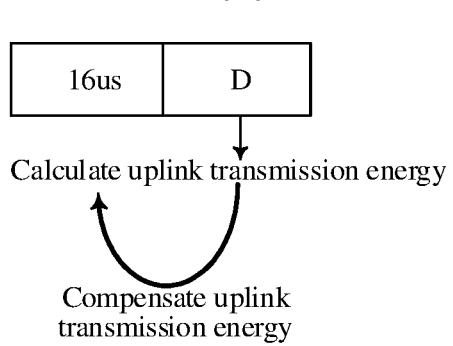
FIG. 5 is a schematic diagram of a monitoring period according to an embodiment of the present disclosure.

Or, as shown in FIG. 5, a calculation time window D is added after $T_f$ and the subsequent detection slot of 9 us, and uplink transmission energy is calculated within the calculation time window D. The base station performs channel energy detection once within the duration $T_f$=16 us, and performs channel energy detection once again within the subsequent detection slot of 9 us, and then calculates the uplink transmission energy within the calculation time window D. Then, the uplink transmission energy is respectively subtracted from the channel energy within $T_f$=16 us and the channel energy within the detection slot of 9 us, and a channel state within $T_f$=16 us and a channel state within the detection slot of 9 us are determined. If the two detected channel states are both idle, it may be determined that the channel state within the monitoring period is idle, and downlink transmission can be performed.

Type 2B Downlink Channel Access Procedure

The base station may send downlink transmission immediately after detecting that a channel is idle for a duration of $T_f$=16 us. $T_f$ includes a detection slot that occurs within the last 9 us of $T_f$.

Figure 6:
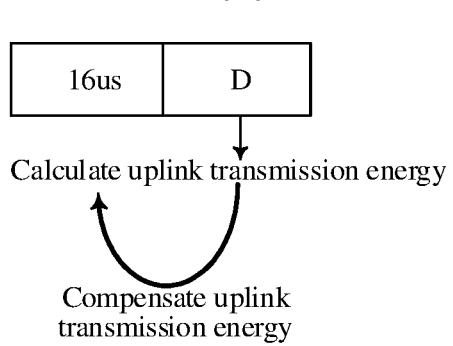
FIG. 6 is a schematic diagram of a monitoring period according to an embodiment of the present disclosure.

It can be seen that, the base station performs channel detection once within the time of the duration $T_f$=16 us, that is, a detection time window of $T_f$=16 us is included in the monitoring period. In order to ensure accuracy of a channel state, according to the method of the embodiments of the present disclosure, as shown in FIG. 6, a calculation time window D is added after $T_f$=16 us, and uplink transmission energy is calculated within the calculation time window D. The base station performs channel energy detection once within the time of the duration $T_f$=16 us, and then calculates the uplink transmission energy within the calculation time window D. Then the uplink transmission energy is subtracted from the channel energy within $T_f$=16 us to determine a channel state within $T_f$=16 us. If the channel state is idle, then downlink transmission can be performed.

Type 3: LBT Suitable for FR2

1) A base station detects a duration of 8 us, and if a channel is idle, execute step 2).

2) Set N=$N_{init}$, where $N_{init}$ is a random number distributed in [1,2,3,4,5] with an average probability.

3) If N>0 and the base station selects a decrement counter, then set N=N−1.

4) Detect a channel within an additional detection slot (5 us), and if the channel within the additional detection slot is idle, execute step 5); otherwise, execute step 6).

5) If N=0, then stop; otherwise, execute step 3).

6) Detect the channel until a busy detection slot is detected within an additional delay duration or all detection slots within the additional delay duration are detected as idle.

7) If the channel is detected as idle in all detection slots within the additional delay duration, turn to step 5); otherwise, execute step 6).

It can be seen that an LBT process suitable for FR2 includes a plurality of detection time windows, and each detection time window is 8 us, 5 us, or an additional delay duration. The additional delay duration may be 5 us, which is not limited in the embodiment of the present disclosure. The foregoing steps 1) to 7) are performed cyclically according to the channel state in each detection time window, and until N=0, it is determined that downlink transmission can be performed.

In order to ensure accuracy of the channel state within each detection time window, according to the method in the embodiments of the present disclosure, a calculation time window D is added between a plurality of detection time windows, or a calculation time window D is added after a plurality of detection time windows. Uplink transmission energy is calculated within the calculation time window D, and the uplink transmission energy is subtracted from channel energy within each detection time window, to determine a channel state within each detection time window.

Figure 7:
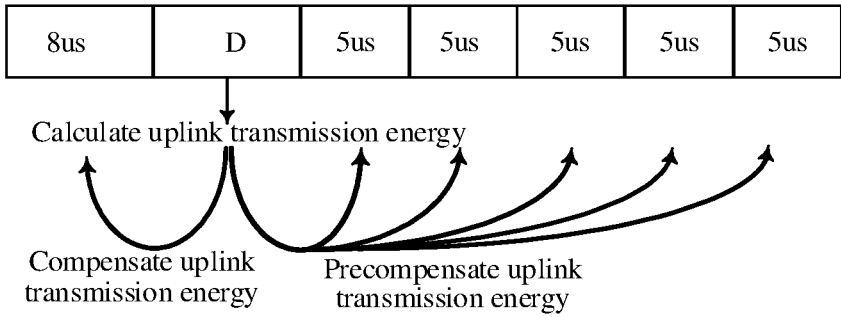
FIG. 7 is a schematic diagram of a monitoring period according to an embodiment of the present disclosure.

As shown in FIG. 7, the calculation time window D being after a first detection time window of 8 us is taken as an example, after performing channel energy detection with a duration of 8 us in the above step 1), the base station, next, calculates the uplink transmission energy within the calculation time window D, and then subtracts the uplink transmission energy from the channel energy within 8 us to determine that a channel state within the first detection time window of 8 us is idle or busy, and continues the foregoing loop according to the channel state within the first detection time window of 8 us. In each subsequent detection time window, the uplink transmission energy is subtracted from the detected channel energy to determine a channel state within each detection time window. Thus, an execution step of the loop is determined, and until N=0, it may be determined that the channel state within the monitoring period is idle, and downlink transmission can be performed.

It should be noted that, in FIG. 7, the calculation time window D being after the first detection time window of 8 us is taken as an example for description, and in actual applications, the calculation time window D may be set after other detection time windows.

It can be seen from the above description of the improvements of CAT4 LBT, One Shot LBT, and LBT suitable for FR2 that, by adding a calculation time window for calculating uplink transmission energy within the monitoring period, the method provided in the embodiments of the present disclosure ensures the accuracy of channel detection, thereby improving the spectrum utilization.

Figure 8:
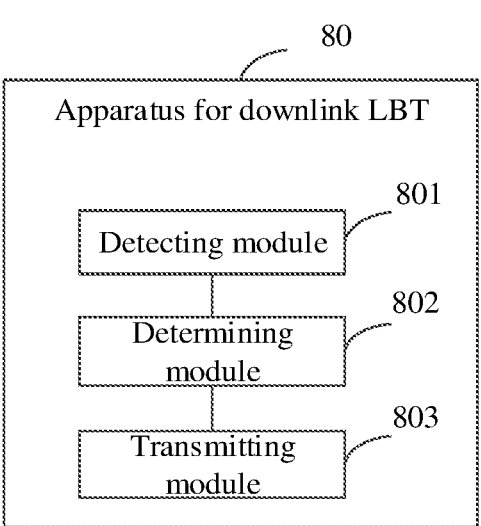
FIG. 8 is a schematic structural diagram of an apparatus for downlink LBT according to an embodiment of the present disclosure.

FIG. 8 is a schematic structural diagram of an apparatus for downlink LBT according to an embodiment of the present disclosure. As shown in FIG. 8, the apparatus for downlink LBT 80 includes:

a detecting module 801, configured to detect channel energy and uplink transmission energy within a monitoring period;

a determining module 802, configured to determine a channel state within the monitoring period according to the channel energy and the uplink transmission energy;

a transmitting module 803, configured to perform downlink data transmission when the channel state is an idle state.

In a feasible implementation manner, the determining module 802 is configured to determine the channel state within the monitoring period according to a difference between the channel energy and the uplink transmission energy.

In a feasible implementation manner, the monitoring period includes at least one detection time window and a calculation time window;

the detecting module 801 is configured to detect respective channel energy within each detection time window, and calculate uplink transmission energy within the calculation time window.

In a feasible implementation manner, the monitoring period includes a plurality of detection time windows, and the calculation time window is between any two detection time windows of the plurality of detection time windows.

In a feasible implementation manner, the calculation time window is after the at least one detection time window.

In a feasible implementation manner, the determining module 802 is configured to: determine a channel state within each detection time window according to a respective difference between the channel energy within each detection time window and the uplink transmission energy; and determine the channel state within the monitoring period according to the channel state within each detection time window.

The apparatus provided in the embodiments of the present disclosure can be used for executing the method for downlink LBT in the described method embodiments, which is implemented using similar principles and produce similar calculation effects. Details will not be described again here.

Figure 9:
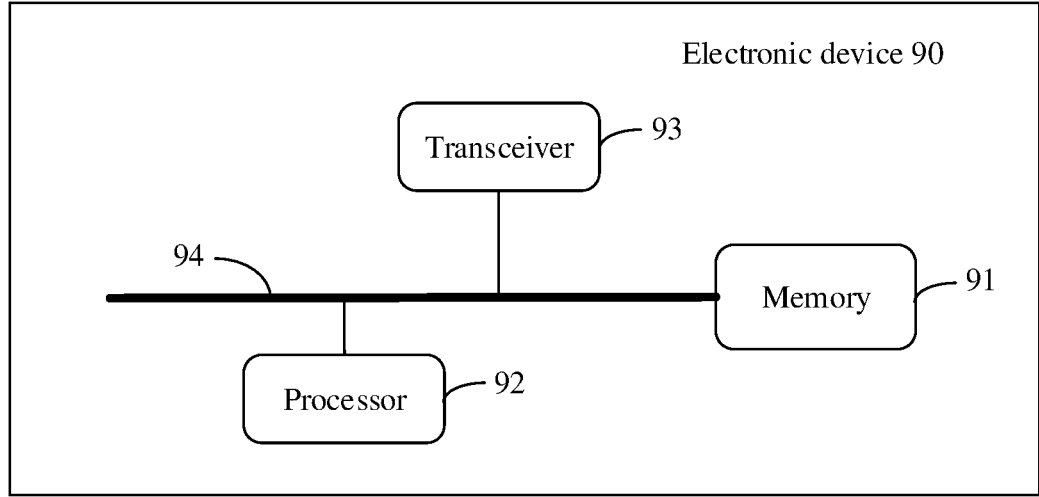
FIG. 9 is a schematic structural diagram of an electronic device according to an embodiment of the present disclosure.

FIG. 9 is a schematic structural diagram of an electronic device according to an embodiment of the present disclosure. As shown in FIG. 9, the electronic device 90 includes: a memory 91, a processor 92, and a transceiver 93, where the memory 91 is in communication with the processor 92. Illustratively, the memory 91, the processor 92, and the transceiver 93 may communicate by using a communication bus 94. The memory 91 is configured to store a computer program, and the processor 92 executes the computer program to implement the foregoing method for downlink LBT. The electronic device 90 may be a network device or a terminal.

In an implementation, the foregoing processor may be a central processing unit (CPU), and may also be other general processor, a digital signal processor (DSP), an application specific integrated circuit (ASIC), and the like. The general processor may be a microprocessor, or the processor may also be any conventional processor. In combination with the steps in the method embodiments disclosed in the present disclosure, the steps may be directly implemented by a hardware processor or implemented by a combination of hardware and software modules in the processor.

An embodiment of the present disclosure further provides a computer-readable storage medium on which a computer program is stored. When the program is executed by a processor, the method according to any of the described method embodiments is implemented.

All or a part of the steps of the foregoing method embodiments may be implemented by a program instructing relevant hardware. The foregoing program may be stored in a readable memory, and when the program is running, the steps of the foregoing method embodiments are performed. The foregoing memory (storage medium) includes a read-only memory (ROM), a RAM, a flash memory, a hard disk, a solid-state drive, a magnetic tape, a floppy disk, an optical disc, and any combination thereof.

The embodiments of the present disclosure are described with reference to flowcharts and/or block diagrams of the method, device (system), and computer program product according to the embodiments of the present disclosure. It should be understood that, each flow and/or block in the flowcharts and/or the block diagrams and a combination of flows and/or blocks in the flowcharts and/or the block diagrams can be implemented by computer program instructions. These computer program instructions may be provided to a processing unit of a general computer, a dedicated computer, an embedded processor or other programmable data processing device to produce a machine, so that the instructions that are executed by the processing unit of the computer or other programmable data processing device generate an apparatus for implementing functions specified in one or more flows in the flowcharts and/or one or more blocks in the block diagrams.

These computer program instructions may also be stored in a computer-readable memory capable of guiding a computer or other programmable data processing device to work in a specific manner, so that the instructions stored in the computer-readable memory generate a manufactured product including an instruction apparatus, and the instruction apparatus implements functions specified in one or more flows in the flowcharts and/or one or more blocks in the block diagrams.

These computer program instructions may also be loaded onto a computer or other programmable data processing devices, so that a series of operational steps are performed on the computer or other programmable devices to produce computer implemented processing. Thus, the instructions executed on the computer or other programmable devices provide steps for implementing functions specified in one or more flows in the flowcharts and/or one or more blocks in the block diagrams.

The present disclosure provides a method and an apparatus for downlink LBT, a device, and a storage medium, so as to improve accuracy of detection on a channel state and improve spectrum utilization.

In a first aspect, the present disclosure provides a method for downlink LBT, including: detecting channel energy and uplink transmission energy within a monitoring period; determining a channel state within the monitoring period according to the channel energy and the uplink transmission energy; performing downlink data transmission when the channel state is an idle state.

In a feasible implementation manner, the determining the channel state within the monitoring period according to the channel energy and the uplink transmission energy includes: determining the channel state within the monitoring period according to a difference between the channel energy and the uplink transmission energy.

In a feasible implementation manner, the monitoring period includes at least one detection time window and a calculation time window; the detecting the channel energy and the uplink transmission energy within the monitoring period includes: detecting respective channel energy within each detection time window, and calculating the uplink transmission energy within the calculation time window.

In a feasible implementation manner, the monitoring period includes a plurality of detection time windows, and the calculation time window is between any two detection time windows of the plurality of detection time windows.

In a feasible implementation manner, the calculation time window is after the at least one detection time window.

In a feasible implementation manner, the determining the channel state within the monitoring period according to the difference between the channel energy and the uplink transmission energy includes:

determining a channel state within each detection time window according to a respective difference between the channel energy within each detection time window and the uplink transmission energy;

determining the channel state within the monitoring period according to the channel state within each detection time window.

In a second aspect, the present disclosure provides an apparatus for downlink LBT, including:

a detecting module, configured to detect channel energy and uplink transmission energy within a monitoring period;

a determining module, configured to determine a channel state within the monitoring period according to the channel energy and the uplink transmission energy;

a transmitting module, configured to perform downlink data transmission when the channel state is an idle state.

In a feasible implementation manner, the determining module is configured to determine the channel state within the monitoring period according to a difference between the channel energy and the uplink transmission energy.

In a feasible implementation manner, the monitoring period includes at least one detection time window and a calculation time window;

the detecting module is configured to detect respective channel energy within each detection time window, and calculate the uplink transmission energy within the calculation time window.

In a feasible implementation manner, the monitoring period includes a plurality of detection time windows, and the calculation time window is between any two detection time windows of the plurality of detection time windows.

In a possible implementation manner, the calculation time window is after the at least one detection time window.

In a feasible implementation manner, the determining module is configured to: determine a channel state within each detection time window according to a respective difference between the channel energy within each detection time window and the uplink transmission energy; and determine the channel state within the monitoring period according to the channel state within each detection time window.

In a third aspect, the present disclosure provides an electronic device, including: a memory, a processor, and a transceiver;

where the memory is configured to store a computer program;

the processor is configured to implement the method according to the first aspect when the computer program is executed.

In a fourth aspect, the present disclosure provides a non-transitory computer-readable storage medium on which a computer program is stored. When the computer program is executed by a processor, the method according to the first aspect is implemented.

The present disclosure provides a method and an apparatus for downlink LBT, a device, and a storage medium. Within a monitoring period, in addition to detecting channel energy, uplink transmission energy is further determined, and this part of uplink transmission energy is removed from total channel energy, so that a channel state can be evaluated based on a more accurate energy value, and spectrum utilization is improved.

Obviously, a person skilled in the art can make various modifications and variations to the embodiments of the present disclosure without departing from the spirit and scope of the present disclosure. As such, should these modifications and variations of the embodiments of the present disclosure belong to the scope of the claims of the present disclosure and their equivalents, the present disclosure is intended to include these modifications and variations.

The invention claimed is:

1. A method for downlink listen before talk (LBT), comprising:

detecting channel energy and uplink transmission energy within a monitoring period;

determining a channel state within the monitoring period according to the channel energy and the uplink transmission energy; and performing downlink data transmission when the channel state is an idle state;

wherein the determining the channel state within the monitoring period according to the channel energy and the uplink transmission energy comprises:

determining the channel state within the monitoring period according to a difference between the channel energy and the uplink transmission energy;

wherein the monitoring period comprises a plurality of detection time windows and a calculation time window, and the detecting the channel energy and the uplink transmission energy within the monitoring period comprises:

detecting respective channel energy within each detection time window, and calculating the uplink transmission energy within the calculation time window.

2. The method according to claim 1, wherein the calculation time window is between any two detection time windows of the plurality of detection time windows.

3. The method according to claim 1, wherein the calculation time window is after the at least one detection time window.

4. The method according to claim 2, wherein the determining the channel state within the monitoring period according to the difference between the channel energy and the uplink transmission energy comprises:

determining a channel state within each detection time window according to a respective difference between the channel energy within each detection time window and the uplink transmission energy; and determining the channel state within the monitoring period according to the channel state within each detection time window.

5. An apparatus for downlink listen before talk (LBT), comprising a memory and a processor, wherein the memory is configured to store a computer program;

when the computer program is executed, the processor is configured to detect channel energy and uplink transmission energy within a monitoring period;

determine a channel state within the monitoring period according to the channel energy and the uplink transmission energy; and perform downlink data transmission when the channel state is an idle state;

wherein the processor is further configured to determine the channel state within the monitoring period according to a difference between the channel energy and the uplink transmission energy;

wherein the monitoring period comprises a plurality of detection time windows and a calculation time window, and the processor is further configured to detect respective channel energy within each detection time window, and calculate the uplink transmission energy within the calculation time window.

6. The apparatus according to claim 5, wherein the calculation time window is between any two detection time windows of the plurality of detection time windows.

7. The apparatus according to claim 5, wherein the calculation time window is after the at least one detection time window.

8. The apparatus according to claim 6, wherein the processor is configured to: determine a channel state within each detection time window according to a respective difference between the channel energy within each detection time window and the uplink transmission energy; and determine the channel state within the monitoring period according to the channel state within each detection time window.

9. A non-transitory computer-readable storage medium on which a computer program is stored, wherein when the computer program is executed by a processor, the following steps are implemented:

detecting channel energy and uplink transmission energy within a monitoring period;

determining a channel state within the monitoring period according to the channel energy and the uplink transmission energy; and performing downlink data transmission when the channel state is an idle state;

wherein the determining the channel state within the monitoring period according to the channel energy and the uplink transmission energy comprises:

determining the channel state within the monitoring period according to a difference between the channel energy and the uplink transmission energy;

wherein the monitoring period comprises a plurality of detection time windows and a calculation time window, and the detecting the channel energy and the uplink transmission energy within the monitoring period comprises:

detecting respective channel energy within each detection time window, and calculating the uplink transmission energy within the calculation time window.

10. The non-transitory computer-readable storage medium according to claim 9, wherein the calculation time window is between any two detection time windows of the plurality of detection time windows.

11. The non-transitory computer-readable storage medium according to claim 9, wherein the calculation time window is after the at least one detection time window.

12. The non-transitory computer-readable storage medium according to claim 10, wherein the determining the channel state within the monitoring period according to the difference between the channel energy and the uplink transmission energy comprises:

determining a channel state within each detection time window according to a respective difference between the channel energy within each detection time window and the uplink transmission energy; and determining the channel state within the monitoring period according to the channel state within each detection time window.

13. The method according to claim 3, wherein the determining the channel state within the monitoring period according to the difference between the channel energy and the uplink transmission energy comprises:

determining a channel state within each detection time window according to a respective difference between the channel energy within each detection time window and the uplink transmission energy; and determining the channel state within the monitoring period according to the channel state within each detection time window.

14. The apparatus according to claim 7, wherein the processor is configured to: determine a channel state within each detection time window according to a respective difference between the channel energy within each detection time window and the uplink transmission energy; and determine the channel state within the monitoring period according to the channel state within each detection time window.

\* \* \* \* \*